(12) United States Patent
Kawakita et al.

(10) Patent No.: US 12,065,591 B2
(45) Date of Patent: Aug. 20, 2024

(54) PACKAGING MATERIAL FOR MOLDING

(71) Applicant: Resonac Packaging Corporation, Hikone (JP)

(72) Inventors: Keitaro Kawakita, Isehara (JP); Yuji Minamibori, Isehara (JP)

(73) Assignee: Resonac Packaging Corporation, Hikone (JP)

( * ) Notice: Subject to any disclaimer, the term of this patent is extended or adjusted under 35 U.S.C. 154(b) by 0 days.

(21) Appl. No.: 17/144,147

(22) Filed: Jan. 8, 2021

(65) Prior Publication Data

US 2021/0214594 A1     Jul. 15, 2021

(30) Foreign Application Priority Data

Jan. 10, 2020   (JP) ................................ 2020-002778
Dec. 2, 2020    (JP) ................................ 2020-199974

(51) Int. Cl.
*C09J 175/06* (2006.01)
*B32B 7/12* (2006.01)
(Continued)

(52) U.S. Cl.
CPC ............... *C09J 175/06* (2013.01); *B32B 7/12* (2013.01); *B32B 15/08* (2013.01); *B32B 15/085* (2013.01);
(Continued)

(58) Field of Classification Search
CPC ............... C09J 175/06; B32B 2037/54; B32B 2307/408; B32B 2307/4026;
(Continued)

(56) References Cited

U.S. PATENT DOCUMENTS 5,683,805 A * 11/1997 Oita ........................... C09J 7/22
                                                                428/343
8,980,413 B2    3/2015 Kang et al.
(Continued)

FOREIGN PATENT DOCUMENTS

CN      106104844         11/2016
CN      107170915 A *      9/2017  ........... B32B 15/088
(Continued)

OTHER PUBLICATIONS

Taiwanese Office Action for corresponding TW Application No. 109146400, Feb. 2, 2024 (w/ machine translation).

*Primary Examiner* — Lee E Sanderson
(74) *Attorney, Agent, or Firm* — MORI & WARD, LLP (57) ABSTRACT

A packaging material for molding includes a heat resistant resin layer as an outer layer; a thermoplastic resin layer as an inner layer; a metal foil layer disposed between the heat resistant resin layer and the thermoplastic resin layer; a first adhesive layer disposed between the metal foil layer and the heat resistant resin layer; and a second adhesive layer disposed between the metal foil layer and the thermoplastic resin layer. The first adhesive layer is composed of a color adhesive agent composition containing a color pigment and an adhesive agent. The color adhesive agent composition contains a color pigment of 2 mass % or more and less than 5 mass % with respect to a solid component. The first adhesive layer is a coating of the color adhesive agent composition of 5 g/m² to 10 g/m². The first adhesive layer contains a color pigment of 0.25 g/m² to 0.49 g/m².

8 Claims, 4 Drawing Sheets

(51) Int. Cl.
    *B32B 15/08*     (2006.01)
    *B32B 15/085*    (2006.01)
    *B32B 15/088*    (2006.01)
    *B32B 15/20*     (2006.01)
    *B32B 27/32*     (2006.01)
    *B32B 27/34*     (2006.01)
    *H01M 50/119*    (2021.01)
    *H01M 50/121*    (2021.01)
    *H01M 50/129*    (2021.01)
    *H01M 50/133*    (2021.01)

(52) U.S. Cl.
    CPC ............ *B32B 15/088* (2013.01); *B32B 15/20* (2013.01); *B32B 27/32* (2013.01); *B32B 27/34* (2013.01); *H01M 50/119* (2021.01); *H01M 50/121* (2021.01); *H01M 50/129* (2021.01); *H01M 50/133* (2021.01); *B32B 2255/06* (2013.01); *B32B 2255/10* (2013.01); *B32B 2255/26* (2013.01); *B32B 2307/306* (2013.01); *B32B 2307/4026* (2013.01); *B32B 2307/408* (2013.01); *B32B 2307/54* (2013.01); *B32B 2457/10* (2013.01)

(58) Field of Classification Search
    CPC .......... B32B 2307/306; B32B 2255/10; B32B 2255/06; B32B 15/08; B32B 7/12
    See application file for complete search history.

(56) References Cited

U.S. PATENT DOCUMENTS

| | | | |
|---|---|---|---|
| 9,029,010 B2 | 5/2015 | Minamibori et al. | |
| 9,397,321 B2* | 7/2016 | Kaibin | .................... B65D 1/34 |
| 9,553,284 B2* | 1/2017 | Minamibori | ............ B32B 27/34 |
| 10,008,700 B2 | 6/2018 | Minamibori et al. | |
| 10,483,503 B2 | 11/2019 | Hashimoto et al. | |
| 10,673,030 B2 | 6/2020 | Akita et al. | |
| 2011/0070422 A1* | 3/2011 | Ammirati | ................ D06N 3/14 |
| | | | 428/297.4 |
| 2014/0242450 A1 | 8/2014 | Oono et al. | |
| 2014/0370368 A1* | 12/2014 | Kaibin | .................... B32B 15/08 |
| | | | 220/604 |
| 2017/0104189 A1* | 4/2017 | He | .......................... B32B 27/32 |
| 2020/0144562 A1* | 5/2020 | Sasaki | ................. H01M 50/124 |
| 2022/0085444 A1* | 3/2022 | Sasaki | ................. H01M 10/0585 |

FOREIGN PATENT DOCUMENTS

| | | |
|---|---|---|
| JP | 2001-260275 | 9/2001 |
| JP | 2011-054563 | 3/2011 |
| JP | 2011-096552 | 5/2011 |
| JP | 2013-505536 | 2/2013 |
| JP | 2013-152907 | 8/2013 |
| JP | 2013-191581 | 9/2013 |
| JP | 2013-224014 | 10/2013 |
| JP | 2014-078513 | 5/2014 |
| JP | 2015-057782 | 3/2015 |
| JP | 2015-166261 | 9/2015 |
| JP | 2015-217577 | 12/2015 |
| JP | 2017-010941 | 1/2017 |
| JP | 2017-162829 | 9/2017 |
| TW | 201504046 | 2/2015 |
| TW | 201731143 | 9/2017 |
| WO | WO0911722 * | 3/1999 |
| WO | WO 2011/016506 | 2/2011 |
| WO | WO 2013/069730 | 5/2013 |
| WO | WO 2019/039506 | 2/2019 |
| WO | WO 2019/142934 | 7/2019 |

\* cited by examiner

PACKAGING MATERIAL FOR MOLDING

TECHNICAL FIELD

The present invention relates to a packaging material for molding suitably used as a case for a secondary battery (lithium-ion secondary battery) for notebook computers, mobile phones, automobiles, and stationary batteries and also suitably used as a packaging material for food or a packaging material for pharmaceutical products.

BACKGROUND ART

A battery, such as, e.g., a lithium-ion secondary battery, is increasingly required that it is colored to unify the appearance and the color of a device, such as, e.g., an electric equipment, to be mounted. For example, in order to give a heavy feeling and a luxurious feeling, such a device is often made in a black color, and in this case, the battery is often also made in a black color.

This type of packaging material is generally a laminated body in which a resin layer is laminated on both sides of a metal foil, and in order to make the battery in a black color or the like, there are means, such as, e.g., coloring a resin layer used in a packaging material, providing a print layer below a base material resin layer, coloring an adhesive layer disposed between a base material resin layer and a shielding metal layer, and coloring an adhesive layer between layers in a case where the base material resin layer is composed of a plurality of layers.

For example, there is an example in which a layer containing a distinguishing mark is provided in any one of a base material layer (resin layer), an adhesive layer, and a metal foil layer of a packaging material for a battery. Further, there is one in which the entire packaging material can be colored by coloring an entirety of a print layer provided in a lower layer of a base material layer or an adhesive agent layer of a base material layer (see Patent Documents 1 and 2)

Further, in some cases, a black body material layer is provided between a metal foil layer and an outer layer film for promoting heat radiation of a packaging material for a battery (see Patent Document 3).

PRIOR ART DOCUMENT

Patent Document

Patent Document 1: International Publication No. WO 2011/016506 A1
Patent Document 2: Japanese Unexamined Patent Application Publication No. 2011-054563
Patent Document 3: Japanese Unexamined Patent Application Publication No. 2011-096552

SUMMARY OF THE INVENTION

Problems to be Solved by the Invention

In the case of coloring the above-described packaging material in black, it is a common practice to provide a print layer with a printing ink containing a pigment such as carbon black.

However, when a print layer containing carbon black as a pigment is provided on an inner surface of an outer resin layer constituting a packaging material for molding in order to color a battery in black, there is the following problem.

That is, at the time of forming the above-described black packaging material into a container (case) shape by deep drawing or stretch forming, the print layer containing carbon black partially cracks and peels off, and the uniform black coloration is impaired by the appearance of an underlayer (not black).

Such partial peeling of the print layer also occurs when the black packaging material is sealed after an electrode or electrolyte is encapsulated, or when a battery packaged with a black packaging material is used in a slightly harsh environment such as in high temperature and high humidity.

Further, a similar problem occurs not only in a black packaging material using carbon black but also in a packaging material colored with other pigments.

Further, in recent years, a battery such as a lithium-ion secondary battery has been increased in capacity, and a packaging material is increasingly required to further have characteristics such as high formability, high heat resistance, and high wet heat resistance.

Means for Solving the Problem

The present invention has been made in view of the technical background and aims to provide a packaging material for molding in which a colored layer does not partially crack and peel off at the time of molding and at the time of sealing, and even when it is used in a slightly severe environment such as in high temperature and high humidity.

That is, the present invention has the configuration as described in the following items [1] to [10].

[1] A packaging material for molding, comprising:
a heat resistant resin layer as an outer layer;
a thermoplastic resin layer as an inner layer;
a metal foil layer disposed between the heat resistant resin layer and the thermoplastic resin layer;
a first adhesive layer disposed between the metal foil layer and the heat resistant resin layer; and
a second adhesive layer disposed between the metal foil layer and the thermoplastic resin layer,
wherein the first adhesive layer is composed of a color adhesive agent composition containing a color pigment and an adhesive agent,
wherein the color adhesive agent composition contains a color pigment of 2 μmass % or more and less than 5 μmass % with respect to a solid component,
wherein the first adhesive layer is a coating of the color adhesive agent composition of 5 g/m² to 10 g/m², and
wherein the first adhesive layer contains a color pigment of 0.25 g/m² to 0.49 g/m².

[2] The packaging material for molding as recited in the above-described Item 1,
wherein an adhesive agent in the color adhesive agent composition contains a two-part curing type polyester urethane resin composed of a polyester resin as a main agent and a polyfunctional isocyanate compound as a curing agent,
wherein the polyester resin has a number average molecular weight (Mn) of 8,000 to 25,000 and a weight average molecular weight (Mw) of 15,000 to 50,000, and a ratio thereof (Mw/Mn) is 1.3 to 2.5, and wherein the polyfunctional isocyanate compound contains aromatic isocyanate of 50 mol % or more.

[3] The packaging material for molding as recited in the above-described Item 2,
wherein in the two-part curing type polyester urethane resin, the polyester resin as a main agent is made from dicarboxylic acid and dialcohol as raw materials, and wherein the dicarboxylic acid contains aliphatic dicarboxylic acid having an even number of methylene of methylene chain and aromatic dicarboxylic acid, and a content rate of the aromatic dicarboxylic acid to a total amount the dicarboxylic acid and the aromatic dicarboxylic acid is 40 to 80 mol %.

[4] The packaging material for molding as recited in the above-described Item 2,
wherein a cured film of the two-part curing type polyester urethane resin is 70 MPa to 400 MPa in a Young's modulus by a tensile test (JIS K7162).

[5] The packaging material for molding as recited in the above-described Item 1,
wherein a film thickness of the first adhesive layer is 4.5 µm to 10 µm.

[6] The packaging material for molding as recited in the above-described Item 1,
wherein a chemical conversion coating is provided on at least one surface of the metal foil layer.

[7] The packaging material for molding as recited in the above-described Item 1,
wherein the heat resistant resin layer is composed of a stretched film with a hot water shrinkage percentage of 2% to 20%.

[8] The packaging material for molding as recited in the above-described Item 1, further comprising:
a matte coating layer formed on an outer surface of the heat resistant resin layer.

[9] A molded case formed by deep drawing or stretch forming the packaging material for molding as recited in any one of the Items 1 to 8.

[10] The molded case as recited in the above-described Item 9,
wherein the molded case is used as a battery case.

Effects of the Invention

In the packaging material for molding as recited in the above-described Item [1], a color is given to the outer surface side of the packaging material for molding by the first adhesive layer. Since the color pigment is defined by the concentration in the color adhesive agent composition, the coating amount of the color adhesive agent composition, and the content of the color pigment in the first adhesive layer, the first adhesive layer does not become brittle due to the color pigment while maintaining uniform and satisfactory coloration, and does not reduce the bonding force between the heat resistant resin layer and the metal foil layer. Therefore, when molding the packaging material with deep drawing, stretch forming, or the like, or when sealing the packaging material for encapsulation, the heat resistant resin layer will not peel off. Further, even when used in a slightly harsh environment such as high-temperature and high-humidity, the heat resistant resin layer will not peel off.

In the packaging material for molding recited in the above-described Item [2], since an adhesive agent containing a particular two-part curing type polyester urethane resin is used, strength and elongation suitable for an adhesive agent coating film and excellent heat resistance can be obtained, and further, and a balance between adhesive agent coatability (wide molecular weight distribution) and performance (narrow-molecular weight distribution) can be maintained.

The packaging material for molding recited in the above-described Items [3] and [4] is particularly effective in preventing peeling between the heat resistant resin layer and the metal foil layer.

In the packaging material for molding as recited in the above-described Item [5], since the film thickness of the first adhesive layer is set to 4.5 µm to 10 µm, it has a sufficient effect of hiding the metallic luster of the metal foil layer, and curling is suppressed, so that the handling property at the time of forming is good.

In the packaging material for molding as recited in the above-described Item [6], since the metal foil layer has a chemical conversion coating on the surface, a packaging material for molding having high corrosion resistance can be provided while preventing the peeling of the adhesive agent and further preventing the corroding of the metal foil.

The packaging material for molding as recited in the above-described Item [7] can obtain high formability since the hot water shrinkage percentage is set to 2% to 20%.

The packaging material for molding as recited in the above-described Item [8] is further excellent in formability because the matte coating layer is formed on the outer surface of the heat resistant resin layer.

According to the molded case as recited in the above-described Item [9], a molded case can be provided in which the heat resistant resin layer does not peel off even at the time of being used in slightly harsh environments such as high temperature and high humidity, and at the time of sealing as well.

According to the molded case as recited in the above-described Item [10], a battery case can be provided in which the heat resistant resin layer does not partially crack and does not peel off at the time of being used in slightly harsh environments such as high temperature and high humidity, and at the time of sealing as well.

EMBODIMENTS FOR CARRYING OUT THE INVENTION

Figure 1:
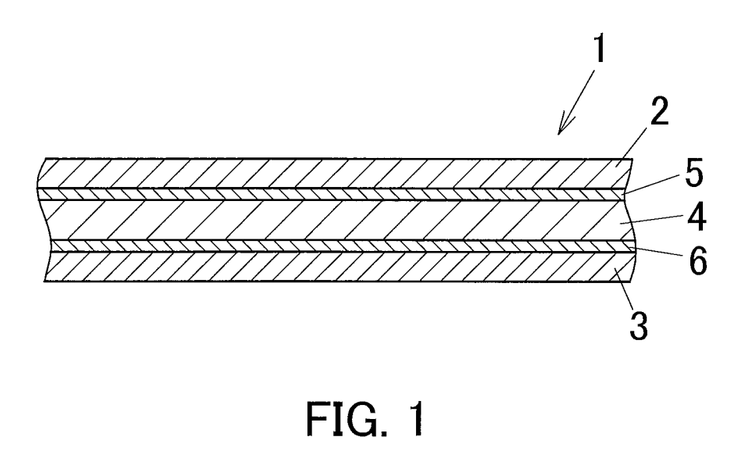
FIG. 1 is a cross-sectional view showing an embodiment of a packaging material for molding according to the present invention.

FIG. 1 shows a packaging material 1 for molding used for a battery case having a basic laminate structure according to an embodiment of the present invention. This packaging material 1 for molding is used as a material for a lithium-ion secondary battery case. That is, the packaging material 1 for molding is subjected to forming, such as, e.g., deep drawing, and is used as a secondary battery case.

The packaging material 1 for a battery case has a structure in which a heat resistant resin layer (outer layer) 2 is integrally laminated on an upper surface of a metal foil layer 4 via a first adhesive layer 5, and a thermoplastic resin layer (inner layer) 3 is integrally laminated on a lower surface of the metal foil layer 4 via a second adhesive layer 6.

Each layer will be described in detail below.

(Heat Resistant Resin Layer)

The above-described heat resistant resin layer (outer layer) 2 is not particularly limited, and the examples thereof include a polyamide film, a polyester film, and the like, and these stretched films are preferably used. Among them, it is particularly preferable to use a biaxially stretched polyamide film, a biaxially stretched polybutylene terephthalate (PBT) film, a biaxially stretched polyethylene terephthalate (PET) film, or a biaxially stretched polyethylene naphthalate (PEN) film as the heat resistant resin layer 2 in terms of formability and intensity. The polyamide film is not particularly limited, and the examples thereof include a 6 nylon film, a 6,6 nylon film, and an MXD nylon film. Note that the heat resistant resin layer 2 may be formed of a single layer or may be formed of a multi-layer made of, for example, a PET film/polyamide film. Further, it is preferable that these films be colorless and transparent in view of sufficiently expressing the coloring effect of the adhesive agent.

The thickness of the heat resistant resin layer 2 is preferably from 9 μm to 50 μm. In the case of using a polyester film, the thickness is preferably 9 μm to 50 μm. In the case of using a polyamide film, the thickness is preferably 10 μm to 50 μm. By setting the thickness to the above-described preferred lower limit value or higher, it is possible to secure the sufficient strength as a packaging material, and by setting it to the above-described preferred upper limit value or lower, it is possible to reduce the stress at the time of stretch forming and at the time of drawing, and therefore it is possible to improve the formability.

Further, it is preferable that the heat resistant resin layer 2 be a stretched film having a hot water shrinkage percentage of 2% to 20%.

The hot water shrinkage percentage is expressed by the dimensional change rate in the stretching direction of the test piece before and after the immersion of the test piece of the heat resistant resin layer 2 (10 cm×10 cm) in hot water at 95° C. for 30 μminutes, and is determined by the following formula.

$$\text{Hot water shrinkage percentage (\%)} = \{(X-Y)/X\} \times 100$$

where X: Dimension in the stretching direction before the immersion treatment, and Y: Dimension in the stretching direction after the immersion treatment.

Note that the hot water shrinkage percentage in the case of adopting a biaxially stretched film is an average value of the dimensional change rate in the two stretching directions.

When the hot water shrinkage percentage is less than 2%, it is difficult to obtain higher formability when performing deep drawing, stretch forming, or the like. On the other hand, when the hot water shrinkage percentage exceeds 20%, the heat resistant resin layer 2 is more likely to peel off from the first adhesive layer 5 when used in a slightly harsh environment, such as, e.g., high temperature and high humidity, after molding, such as, e.g., deep drawing and stretch forming. Among these, a stretched film having a hot water shrinkage percentage of 2.5% to 10% is preferably used as the heat resistant resin layer 2. Further, it is more preferable to use a stretched film having a hot water shrinkage percentage of 3.0% to 6.0%. It is more particularly preferable to use a stretched film having a hot water shrinkage percentage of 3.5% to 5.0%.

(Thermoplastic Resin Layer)

The thermoplastic resin layer (inner layer) 3 is responsible for imparting excellent chemical resistance against a highly corrosive electrolyte or the like used in a lithium-ion secondary battery or the like and heat sealability to the packaging material.

Although the thermoplastic resin layer 3 is not particularly limited, a thermoplastic resin unstretched film layer is preferable. The thermoplastic resin layer 3 is not particularly limited, but in terms of chemical resistance and heat sealability, it is preferably composed of an unstretched film composed of at least one thermoplastic resin selected from the group consisting of polyethylene, polypropylene, an olefin copolymer, an acid-modified product, and ionomer thereof.

It is preferable that the thickness of the thermoplastic resin layer 3 be set to 20 μm to 100 μm. By setting the thickness to 20 μm or more, the generation of pinholes can be sufficiently prevented, and by setting the thickness to 100 μm or less, the amount of resin used can be reduced, which in turn can reduce costs. Among them, it is particularly preferable that the thickness of the thermoplastic resin layer 3 be set to 30 μm to 50 μm. Note that the thermoplastic resin layer 3 may be a single layer or a multi-layer. As a multi-layer film, a three-layer film in which a polypropylene random copolymer film is laminated on both surfaces of a polypropylene block copolymer film can be exemplified.

(Metal Foil Layer Layers)

The metal foil layer 4 is responsible for imparting a gas barrier property for preventing oxygen and moisture from entering the packaging material 1 for molding. The metal foil layer 4 is not particularly limited, but examples thereof include ah aluminum foil, a copper foil, a stainless-steel foil, and the like, and an aluminum foil is generally used. The thickness of the metal foil layer 4 is preferably 20 μm to 100 μm. When the thickness is 20 μm or more, the generation of pinholes at the time of rolling in producing the metal foil layer can be prevented, and when the thickness is 100 μm or less, stresses at the time of stretch forming or drawing can be reduced, and therefore the formability can be improved.

(First Adhesive Layer)

The first adhesive layer 5 is a layer responsible for bonding between the metal foil layer 4 and the heat resistant resin layer 2 which is an outer layer and for concealing the metal foil layer 4 by imparting a color (including an achromatic color) to the outer surface side of the packaging material 1 for molding.

The first adhesive layer 5 is made of a color adhesive agent composition containing a color pigment and an adhesive agent. The present invention defines the coating amount of the color pigment concentration in the color adhesive agent composition and the coating amount of the color adhesive agent composition, and further defines the range of the content of the color pigment in the first adhesive layer 5 determined by the color pigment concentration and the coating amount. By defining the color pigment by these three references, it is possible to prevent the cured first adhesive layer 5 from becoming brittle while obtaining a visual effect by the color pigment.

That is, even in the case of a color adhesive agent composition having a low color pigment concentration, it is possible to obtain a visual effect due to the color pigment when the coating amount is sufficient, and since the color pigment concentration in the color adhesive agent composition is low, the cured first adhesive layer 5 does not become brittle. Thus, the bonding force between the heat resistant resin layer 2 and the metal foil layer 4 is not lowered. Therefore, when the packaging material is molded with deep drawing or stretch forming or the like and when the packaging material is sealed for sealing, the heat resistant resin layer does not peel off. Further, even when used in slightly harsh environments, such as, e.g., high temperature and high humidity, the heat resistant resin layer 2 does not peel off.

The color adhesive agent composition contains a color pigment of 2 μmass % or more and less than 5 μmass % of the solid component of the colored adhesive agent composition. When the content rate of the color pigment in the color adhesive agent composition is less than 2 μmass %, the first adhesive layer 5 is less visual effects. When it is 5 μmass % or more, the first adhesive layer 5 becomes hard and brittle, reducing the adhesive force to the metal foil layer 4. Therefore, the heat resistant resin layer 2 becomes easier to peel off. The preferred content rate of the color pigment is 2.5 μmass % to 4.9 μmass %.

The first adhesive layer 5 is formed by coating a color adhesive agent composition of 5 g/m² to 10 g/m². When the coating amount of the colored adhesive composition is less than 5 g/m², the effect of concealing the metallic luster of the metal foil layers 4 is small, resulting in a reduced visual effect by the color pigment. On the other hand, when the coating amount of the colored adhesive composition exceeds 10 g/m², the processability is lowered, which leads to an increase in costs. A preferred coating amount of the colored adhesive composition is 6 g/m² to 10 g/m².

Further, it is preferable that the film thickness of the first adhesive layer 5 be in the range of 4.5 μm to 10 μm. When the film thickness is less than 4.5 μm, the effect of concealing the luster of the metal foil layer 4 is small. On the other hand, when the film thickness exceeds 10 μm, when the packaging material 1 for molding is produced, a longer drying time is required, resulting in a deteriorated production efficiency, and in a produced packaging material 1 for molding, the handling efficiency at the time of molding may be deteriorated due to the occurrence of curling.

The above-described curling denotes a phenomenon in which the edge of the packaging material 1 for molding is curled up due to the difference of the shrinkage rate between the material used for the outer layer (the heat resistant resin layer 2) and the material used for the inner layer (the thermoplastic resin layer 3) due to the aging treatment in the production process of the packaging material 1 for molding. When the packaging material 1 for molding is curled, it becomes difficult to handle when forming it into a battery case, a container body, or a lid member. Accordingly, by setting the film thickness of the first adhesive layer 5 in the range of 4.5 μm to 10 μm, it is possible to sufficiently obtain the concealing effect of the metallic luster of the metal foil layer 4 and to suppress the occurrence of curling to obtain a packaging material 1 for molding having a good handling property. The especially preferable film thickness of the first adhesive layer 5 is 5 μm to 7 μm.

The first adhesive layer contains a color pigment of 0.25 g/m² to 0.49 g/m². When the content of the color pigment in the first adhesive layer 5 is less than 0.25 g/m², the effect of concealing the metallic luster of the metal foil layers 4 is insufficient, resulting in an insufficient visual effect by the color pigment. A satisfactory visual effect can be obtained by 0.49 g/m². A large amount of the color pigment exceeding 0.49 g/m² is wasted. Therefore, the preferable content of the color pigment in the first adhesive layer 5 is 0.25 g/m² to 0.3 g/m².

In the above-described color adhesive agent composition, the type of the color pigment is not limited, and an azo-based pigment, a phthalocyanine-based pigment, a condensed polycyclic pigment, an inorganic-based pigment, and the like can be used. Further, carbon black can be recommended as a black pigment. Further, it is preferable to use a color pigment having an average particle diameter of 0.1 μm to 5 μm, and the particularly preferred average particle diameter is 0.5 μm to 2.5 μm. When dispersing the pigment, it is preferable to disperse the pigment using a pigment disperser. When dispersing the pigment, it is possible to use a pigment dispersant, such as, e.g., a surfactant.

Although there is no limitation on the type of the adhesive agent in the above-described color adhesive agent composition, it is required to satisfy the condition that it is excellent in adhesion strength and formability and can suppress interlayer separation when performing deep shaping. As an adhesive agent that meets such requirements, an adhesive agent containing a two-part curing type polyester urethane resin composed of a polyester resin as a main agent and a polyfunctional isocyanate compound as a curing agent can be recommended.

The above-described polyester resin is a copolymer composed of polycaboxylic acid and polyhydric alcohol as raw materials, and the preferred materials and compositions are as follows.

It is preferable to use both aromatic dicarboxylic acid and aliphatic dicarboxylic acid as the polycaboxylic acid. Further, an odd/even of a methylene number of a methylene chain of an aliphatic dicarboxylic acid is a factor that affects the crystallinity of a resin. Dicarboxylic acid having an even number of the methylenes produces a hard resin having high crystallinity, and therefore aliphatic dicarboxylic acid having an even number of methylenes is preferably used. As the aliphatic dicarboxylic acid having an even number of methylenes, succinic acid (methylene number 2), adipic acid (methylene number 4), suberic acid (methylene number 6), and sebacic acid (methylene number 8) can be exemplified.

As aromatic dicarboxylic acid, isophthalic acid, terephthalic acid, naphthalenedicarboxylic acid, and phthalic anhydride can be exemplified.

Further, by setting the content rate of the aromatic dicarboxylic acid to the total amount of the aliphatic dicarboxylic acid and the aromatic dicarboxylic acid in the range of 40 mol % to 80 mol %, in other words, by keeping the content rate of the aliphatic dicarboxylic acid in the range of 20 mol % to 60 mol %, it is possible to provide a packaging material for molding capable of producing a resin having high adhesion strength and good formability, capable of molding into a case with a high sidewall with good, formability, and also capable of suppressing the interlayer separation between the metal foil layer 4 and the heat resistant resin layer 2. Further, when the content rate of the aromatic dicarboxylic acid is less than 40 mol %, the film physical properties decrease, thereby easily causing aggregation peeling. As a result, interlayer separation is likely to occur. On the other hand, when the content rate of the aromatic dicarboxylic acid exceeds 80%, the resin becomes hard and the adhesive properties tend to decrease. The particularly preferable content rate of the aromatic dicarboxylic acids is 50 mol % to 70 mol %.

As the polyhydric alcohol, ethylene glycol, propylene glycol, 1,3 butanediol, 1,4-butanediol, diethylene glycol, dipropylene glycol, neopentyl glycol, 1,5-pentanediol, 1,6-hexanediol, octanediol, and 1,4-cyclohexanediol, 2-butyl-2-ethyl-1,3-propanediol, can be exemplified.

The molecular weight of the above-described polyester resin is defined such that the number average molecular weight (Mn) is in the range of 8,000 to 25,000 and the weight average molecular weight (Mw) is in the range of 15,000 to 50,000, and the ratio (Mw/Mn) thereof is 1.3 to 2.5. When the number average molecular weight (Mn)) is 8,000 or more and the weight average molecular weight (Mw) is 15,000 or more, suitable coating film strength and heat resistance can be obtained. When the number average molecular weight (Mn) is 25,000 or less and the weight average molecular weight (Mw) is 50,000 or less, suitable coating film elongation is obtained without becoming too hard. Further, when the ratio (Mw/Mn) is 1.3 to 2.5, it becomes a suitable molecular weight distribution, which makes it possible to balance the adhesive agent applicability (wide distribution) and the performance (narrow distribution). The particularly preferable number average molecular weight (Mn) of the polyester resin is 10,000 to 23,000, and a particularly preferable weight average molecular weight (Mw) thereof is 20,000 to 40,000, and a particularly preferred (Mw/Mn) is from 1.5 to 2.3.

The molecular weight of the above-described polyester resin can be adjusted by chain-extension with isocyanates which are polyfunctional. In other words, when the polyester components in the main agent are linked with NCO, a polymer having a terminal of a hydroxyl group is generated, and the molecular weight of the polyester resin can be adjusted by adjusting the equivalent ratio of the isocyanate group to the hydroxyl group of the polyester. In the present invention, it is preferable to use those linked so that the equivalent ratio (OH/NCO) is 1.01 to 10. Further, as another molecular weight adjusting method, a change in the reaction condition of the polycaboxylic acid and the polyhydric alcohol of the condensation polymerization reaction (adjustment of the compounding molar ratio of the polycaboxylic acid to the polyhydric alcohol) can be exemplified.

Further, an epoxy-based resin or an acryl-based resin may be added as an additive agent of the adhesive main agent.

As a polyfunctional isocyanate compound as the above-described curing agent, various isocyanate compounds of an aromatic system, an aliphatic system, and an alicyclic system can be used. Specific examples thereof include a polyfunctional isocyanate modified product composed of one or two or more of diisocyanates, such as, e.g., a hexamethylene diisocyanate (HDI), an isophorone diisocyanate (IPDI), above an aliphatic system, and a tolylene diisocyanate (TDI), a diphenylmethane diisocyanate (MDI), above an aromatic system. As the denaturation means, in addition to an adduct with a multifunctional active hydrogen compound, such as, e.g., water, glycerin, and trimethylolpropane, a polyfunctional isocyanate modified product due to the abundance reaction of isocyanuration, carbodiimidation, polymerization, etc., and one or more of these can be mixed and used. However, in order to increase the adhesion strength after curing to obtain a peeling preventing effect of the heat resistant resin layer 2, it is preferable to contain 50 mol % or more of an aromatic isocyanate compound. The particularly preferable content rate of the aromatic isocyanate compound is 70 mol % or more.

In the above-described two-part curing type polyester urethane resin, it is preferable that the main agent and the curing agent be blended at a blending ratio of 2 mol to 25 mol of the isocyanate functional group (—NCO) per 1 mol of the polyol hydroxyl group (—OH). When the molar ratio (—NCO)/(—OH) is less than 2 and the isocyanate functional group (—NCO) is reduced, a satisfactory curing reaction will not be performed, which may result in unsuitable coating film strength and heat resistance. On the other hand, when (—NCO)/(—OH) exceeds 25 and the isocyanate functional group (—NCO) increases, the reaction with the functional group other than the polyol may proceed too much, causing an excessively hard coating film, which may result in unsuitable elongation. The particularly preferred molar ratio (—NCO)/(—OH) of the polyol hydroxyl group and the isocyanate functional group is 5 to 20.

It is preferable that in the two-part curing type polyester urethane resin, the cured film after reacting has the following physical properties. It is preferable that the cured film have a Young's modulus according to the tensile test (JIS K7162) of 70 MPa to 400 MPa in order to ensure good formability of the packaging material 1 for molding and joining strength between layers. It is particularly preferable that the Young's modulus be 100 MPa to 300 MPa. Further, it is preferable that the breaking strength be 20 MPa to 70 MPa and the breaking elongation be 50% to 400%. It is particularly preferable that the breaking strength be 30 MPa to 50 MPa, and a particularly preferred breaking elongation is 100% to 300%.

Figure 2:
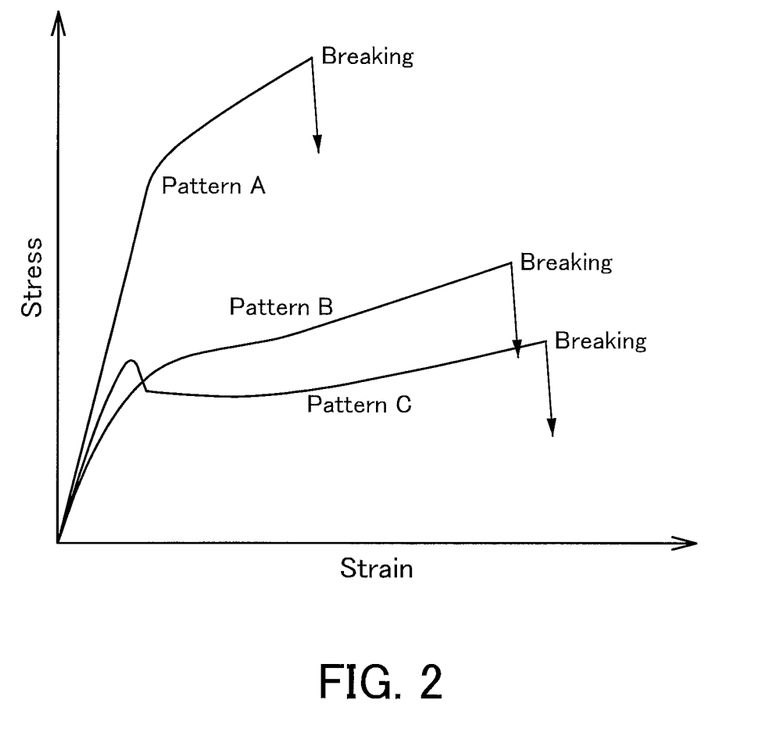
FIG. 2 is a diagram showing S-S curves of cured films of a two-part curing type polyester urethane resin adhesive agent.

Furthermore, it is preferable that the stress-strain curve (S-S curve) do not exhibit a strength reduction before breaking. FIG. 2 shows three patterns of the S-S curve. The pattern A is small in the strain amount with respect to the stress and the pattern B is large in the strain amount with respect to the stress, but the strain amount increases with the increase of the stress, and the intensity does not decrease before breaking. On the other hand, the pattern C shows a decrease in the stress in the process of increasing the strain amount, indicating a decrease in the strength before breaking. In the present invention, it is preferable that the cured film of the two-part curing type adhesive agent do not decrease in the strength in the S-S curve. More preferably, there is no critical point at which the intensity abruptly changes in the S-S curve.

The adhesive agent containing the two-part curing type polyester urethane resin is obtained as a low-viscosity fluid by subjecting the polycaboxylic acid and the polyhydric alcohol, which are raw materials of an additive agent, to a polycondensation reaction, and if necessary, further subjecting to chain elongation with isocyanate which is polyfunctional, mixing various additives, such as, e.g., a solvent, an urethanization reaction catalyst, a coupling agent or an epoxy resin for improving adhesive force, an antifoaming agent, a leveling agent, an ultraviolet absorbing agent, and an antioxidant agent to obtain a flowable polyester resin solution, and then blending the flowable polyester region solution and a polyfunctional isocyanate compound as a curing agent and further a solvent to prepare a low viscosity fluid.

The color adhesive agent composition is prepared by blending a color pigment and an adhesive agent (including a solvent, various additive agents) containing the two-part curing type polyester urethane resin prepared by the above-described method at a predetermined ratio. The method of laminating the metal foil layers 4 and the heat resistant resin layer 2 is not limited, but a method called "dry lamination" can be recommended. Specifically, the prepared color adhesive agent composition is applied on the upper surface of the metal foil layer 4, or the lower surface of the heat resistant resin layer 2, or both surfaces thereof. After evaporating the solvent to form a dry film, the metal foil layer 4 and the heat resistant resin layer 2 are bonded to each other. Thereafter, it is further cured according to the curing conditions of the two-part curing type polyester urethane resin. With this, the metal foil layer 4 and the heat resistant resin layer 2 are bonded via the first adhesive layer 5. Note that, as the coating method of the color adhesive agent composition, a gravure coating method, a reverse roll coating method, a lip roll coating method, and the like can be exemplified.

(Second Adhesive Layer)

The second adhesive layer 6 is not particularly limited, and examples thereof include an adhesive agent layer made of a polyurethane-based adhesive agent, an acryl-based adhesive agent, an epoxy-based an adhesive agent, a polyolefin-based adhesive agent, an elastomer-based adhesive agent, a fluorine-based adhesive agent, a modified polypropylene adhesive agent, and the like. Among them, an acrylic adhesive agent or a polyolefin-based adhesive agent is preferably used, and in this case, the electrolyte resistance and the water vapor barrier property of the packaging material 1 can be improved.

Although there is no limitation on the method of bonding the metal foil layer 4 and the thermoplastic resin layer 3, as in the case of bonding the metal foil layer 4 and the heat resistant resin layer 2 described above, a dry lamination method in which an adhesive agent constituting the second adhesive layer is applied and dried, then the metal foil layer 4 and the thermoplastic resin layer 3 are bonded, can be exemplified.

(Production of Packaging Material for Molding)

The above-described heat resistant resin layer 2 is bonded to the upper surface of the metal foil layer 4 via the above-described first adhesive agent layer 5 (a color adhesive agent composition), and the above-described thermoplastic resin layer 3 is bonded to the lower surface of the metal foil layer 4 via the second adhesive layer 6 to form a laminate. By holding this laminate at a predetermined temperature according to the curing conditions of the used two-part curing type polyester urethane resin, the metal foil layer 4 and the thermoplastic resin layer 3 is produced in which the heat resistant resin layer 2 and the thermoplastic resin layer 3 are bonded to both surfaces of the metal foil layer 4 via the first adhesive layer 5 and the second adhesive layer 6, respectively.

Note that the bonding method and the bonding step of the layers of the packaging material for molding according to the present invention are not limited to the above-described method and bonding step. Packaging materials produced by other methods and/or other steps are also within the scope of the present invention.

[Other Embodiments of Packaging Material for Molding]

The packaging material for molding according to the present invention is not limited to the stack configuration as shown in FIG. 1 and may be a packaging material in which additional layers are provided to improve its function. In the packaging material 1 for molding shown in FIG. 3, chemical conversion coatings 11a and 11b are formed on both surfaces of the metal foil layer 4. Further, in a packaging material 20 for molding shown in FIG. 4, in addition to the chemical conversion coatings 11a and 11b, a matte coating layer 21 is formed on the outer surface of the heat resistant resin layer 2.

(Chemical Conversion Coating of Metal Foil Layer Layer)

Figure 3:
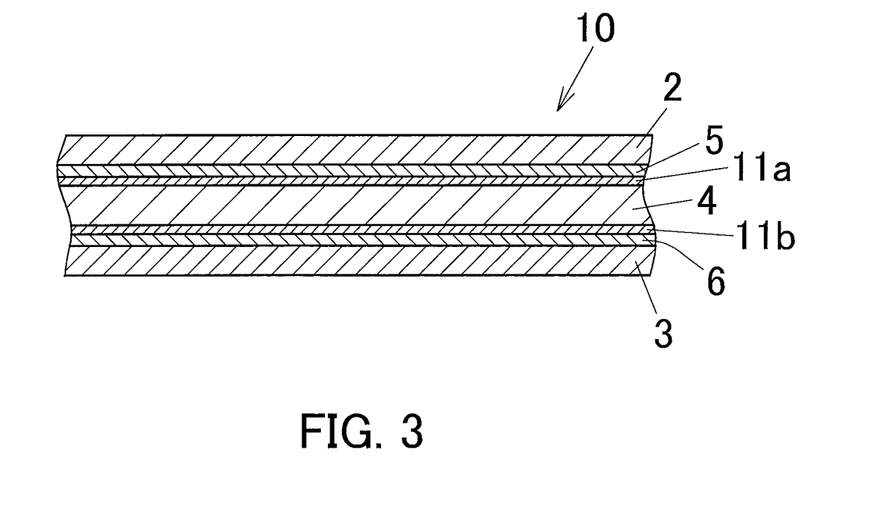
FIG. 3 is a cross-sectional view showing another embodiment of a packaging material for molding according to the present invention.

The outer layer and the inner layer of the packaging material for molding each are a layer made of resin. Light, oxygen, and liquid may enter into the resin layer from the outside of the case, although it is extremely small in amount. Further, contents (electrolyte, food, medicine, and the like of a battery) may be impregnated from the inside. When these intrusions reach the metal foil layer, they cause the corrosion of the metal foil layer. In the packaging material for molding according to the present invention, the corrosion resistance of the metal foil layer 4 can be improved by forming the chemical conversion coatings 11a and 11b having a higher corrosion resistance on the surface of the metal foil layer 4.

The chemical conversion coating is a film formed by subjecting a metal foil layer surface to a chemical conversion treatment and can be formed, for example, by subjecting a metal foil layer to a chromate treatment or a non-chromium type chemical conversion treatment using a zirconium compound. For example, in the case of a chromate treatment, an aqueous solution of any one of the following 1) to 3) is coated on the surface of the metal foil layer subjected to a degreasing treatment and then dried.

1) a mixture of phosphoric acid, a chromic acid, and at least one of a metal salt of fluoride and a non-metal salt of fluoride
2) a mixture of phosphoric acid, an acryl-based resin, one of a chitosan derivative resin and a phenol-based resin, and at least one of chromic acid and chromium (III) salt
3) a mixture of a phosphoric acid, any one of an acryl-based resin, a chitosan derivative resin, and a phenol-based resin, at least one of a chromic acid and a chromium (III) salt, and at least one of a metal salt of fluoride and a non-metal salt of fluoride.

It is preferable that the chemical conversion coatings 11a, 11b each have a chromium adhesion amount of 0.1 mg/m$^2$ to 50 μmg/m$^2$, and particularly 2 μmg/m$^2$ to 20 μmg/m$^2$. Such a chromium adhesion amount for the chemical conversion coating can result in high corrosion resistance of the packaging material for molding.

Note that although the packaging material 10 for molding of FIG. 3 is an example in which the chemical conversion coatings 11a and 11b are formed on both surfaces of the metal foil layers 4, a packaging material having a chemical conversion coating on either surface is also included in the present invention.

(Matte Coating Layer)

Figure 4:
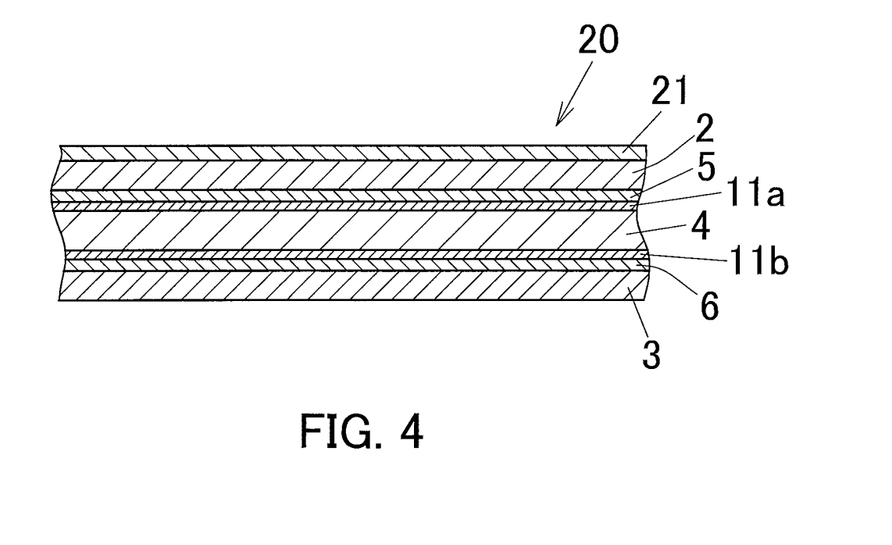
FIG. 4 is a cross-sectional view showing still another embodiment of a packaging material for molding according to the present invention.

The matte coating layer 21 is formed on the outer surface of the heat resistant resin layer 2 and serves as a layer for imparting good slipperiness to the surface of the packaging material 20 for molding to improve the formability.

The above-described matte coating layer 21 is a matte coating layer made of a resin composition in which fine inorganic particles are dispersedly contained in a heat resistant resin composition. Among them, it is preferable that the matte coating layer 21 be made of a resin composition in which fine inorganic particles having an average particle diameter of 1 μm to 10 μm is contained in a two-part curing type heat resistant by 0.1 μmass % to 1 μmass %.

The examples of the heat resistant resin include an acryl-based resin, an epoxy-based resin, a polyester based resin, an urethane-based resin, a polyolefin-based resin, and a fluorine based resin. In view of excellent formability, chemical resistance, solvent resistance, and scratch resistance, it is preferable to use a resin in which the resin is made of a resin composition containing a main agent resin containing a phenoxy resin and a urethane resin and a curing agent and that the mass ratio of the phenoxy resin and the urethane resin in the main agent resin is 0.5 to 2 of the urethane resin with respect to the phenoxy resin 1. Further, it is possible to use a two-part curing type heat-resistant resin in which the main agent is a polyol and the curing agent is a polyfunctional isocyanate.

As the above-described fine inorganic particles, the examples thereof include, but not limited to, silica, alumina, calcium oxide, calcium carbonate, calcium sulfate, and calcium silicate, and among them, silica is preferably used.

The forming of the matte coating layer 21 is performed by applying a matte coating composition containing the above-described inorganic fine particles and heat resistant resin to the surface of the heat resistant resin layer 2 and curing it.

The thickness of the matte coating layer 21 after curing is preferably 0.5 µm to 5 µm. The slipperiness improvement is less effective in the layer thinner than the lower limit value, and the cost is increased in the layer thicker than the upper limit value. It is especially preferable that the thicknesses be in a range of 1 µm to 3 µm.

The gloss value of the surface of the matte coating layer 21 is preferably set to 1% to 15% in the 60° reflection angle measurement based on JIS Z8741. The above-described gloss value can be measured at a 60° reflection angle by, for example, gloss meter "micro-TRI-gloss-s" produced by BYK GmbH.

The step of forming the matte coating layer 21 can be performed any time after bonding the heat resistant resin layer 2 to the metal foil layer 4 via the first adhesive layer 5. After bonding the heat resistant resin layer 2 and then bonding the thermoplastic resin layer 3, the matte coating layer 21 can be formed, or after bonding the heat resistant resin layer 2 and the thermoplastic resin layer 3 to the metal foil layer 4, the matte coating layer 21 can be formed.

Although the packaging material 20 for molding of FIG. 4 is an example in which both the chemical conversion coatings 11a and 11b and the matte coating layer 21 are added to the basic constitution of FIG. 1, it is not necessary to be provided these simultaneously, and the packaging material in which only the matte coating layer 21 is added to the basic constitution of FIG. 1 is also included in the present invention.

[Molded Case]

By molding (deep drawing, stretch forming, etc.) the packaging material 1, 10, 20 for molding of the present invention, a molded case (battery case, etc.) can be obtained.

EXAMPLES

Next, specific examples of the present invention will be described. Note that the present invention is not particularly limited to these examples.

[Production of Packaging Material for Molding]

In the following Examples 1 to 5 and Comparative Examples 1 to 5, packaging materials 20 for molding having a laminated structure as shown in FIG. 4 were produced. These packaging materials differed only in the color pigment concentration in the color adhesive agent composition constituting the first adhesive agent layer 5, the coating amount of the color adhesive agent composition, the content of the color pigment in the first adhesive layer, and the heat resistant resin layer 2, and the other materials are common. The common materials were as follows.

The metal foil layer 4 was an aluminum foil 4 made of an A8079 aluminum having a thickness of 40 µm. A chemical conversion treatment liquid made of polyacrylic acid, a chromium (III) compound, water, and alcohol was applied on both surfaces of the aluminum foil and dried at 150° C. to form chemical conversion coatings 11a and 11b. The chromium adhesion amount according to the chemical conversion coatings 11a and 11b was 10 µmg/m².

The thermoplastic resin layer 3, which is an inner layer, was a 40 µm thick unstretched polypropylene film.

A polyacrylic adhesive agent was used for the second adhesive layer 6.

(First Adhesive Layer)

The color adhesive agent composition constituting the first adhesive layer 5 was prepared in the following manner using a carbon black as a color pigment and a two-part curing type polyester urethane resin as an adhesive agent First, a polyester resin (polyester polyol) which is a main agent of the two-part curing type polyester urethane resin was produced. The polyester polyol as the main agent was obtained by melting 30 mol parts of neopentyl glycol, 30 mol parts of ethylene glycol, and 40 mol parts of 1,6-hexanediol at 80° C., and 30 mol parts of an adipic acid (methylene number 4) which is an aliphatic dicarboxylic acid and 70 mol parts of an isophthalic acid which is an aromatic dicarboxylic acid were subject to a condensation polymerization reaction at 210° C. for 20 hours while stirring. This polyester polyol had a number average molecular weight (Mn) of 12,000, a weight average molecular weight (Mw) of 20,500, and the ratio (Mw/Mn) was 1.71. Further, 60 parts by mass of ethyl acetate was added to this polyester polyol of 40 parts by mass to obtain a fluid polyester polyol resin solution. Further, the hydroxyl value was 2.2 µmgKOH/g (solution-value).

Next, a required amount of carbon black having an average particle diameter of 1.0 µm was blended with 100 parts by mass of the above-described polyester polyol resin solution and 64.4 parts by mass of the ethyl acetate. The pigment disperser was used to disperse the carbon black pigment to obtain a main agent containing a color pigment prepared in which the carbon black concentration was as shown in Table 1 with respect to the solid component (the sum of the polyester polyol and the carbon black). Then, the color adhesive agent composition was obtained by blending, with respect to 100 parts by mass of a main agent containing a color pigment, 7.1 parts by mass of adduct (NCO %: 13.0%, solid content: 75%) of tolylene diisocyanate (TDI) (aromatic) which is an aromatic isocyanate compound and trimethylolpropane, as a curing agent, and further blending 34.1 parts by mass of ethyl acetate and stirring them well. In the color adhesive agent composition, the molar ratio (—NCO)/(—OH) of the isocyanate functional group (—NCO) and the polyester polyol hydroxyl group (—OH) was 10.

A cured film of the above-described two-part curing type polyester urethane resin adhesive agent, i.e., a cured film of a composition in which a color pigment was removed from the composition of the first adhesive layer, was prepared to evaluate its physical properties.

On the non-adhesive untreated PP film, the two-part curing type polyester urethane resin adhesive agent was applied so that the thickness after drying became 50 µm, and the solvent was dried, followed by curing by performing an aging treatment at 60° C. until the residual isocyanate became 5% or less. The cured film was peeled from the untreated PP film and cut to a 15 mm-width. Thus, a test piece was obtained.

The prepared test piece was subjected to a tensile test under the conditions of 50 mm gauge length and 200 mm/min tensile rate, and the Young's modulus, the breaking strength and the breaking elongation were measured. The Young's modulus was 140 MPa, the breaking strength was 48 MPa, and the breaking elongation was 217%. Further, the S-S curve in this tensile test was obtained. The obtained pattern A is shown in FIG. 2.

(Heat Resistant Resin Layer)

In Examples 1 to 4 and Comparative Example 5, as the heat resistant resin layer, a biaxially stretched nylon film having a hot water shrinkage percentage of 4.0% and a thickness of 25 µm was used. In Example 5 and Comparative Examples 1 to 4, as the heat resistant resin layer, a biaxially stretched nylon film having a thickness of 25 µm and a hot water shrinkage percentage of 1.5% was used (see Table 1).

Note that the hot water shrinkage percentage was measured by the above-described method.
(Lamination of Each Layer)

On one surface of the aluminum foil 4 on which chemical conversion coatings 11a and 11b were formed, a predetermined amount of a color adhesive agent composition was applied and dried to form a first adhesive layer 5. The composition and the coating amount (weight after drying) of the color adhesive agent composition of each Example are shown in Table 1, and the carbon black content in the first adhesive layer 5 calculated from these and the film thickness of the first adhesive layer 5 after drying are shown in Table 1. Then, the heat resistant resin layer 2 was bonded to the first adhesive layer 5.

Then, the polyacrylic adhesive agent was applied as a second adhesive layer 6 on the other side of the aluminum foil, and the thermoplastic resin layer 3 was bonded.

For the matte coating layer 21, a matte coating composition was prepared by mixing 80 parts by mass of fluoroethylene vinyl ester as a heat resistant resin and 10 parts by mass of barium sulfate and 10 parts by mass of powdered silica as fine inorganic particles. This matte coating composition was applied to the heat resistant resin layer 2 to have a thickness of 2 μm after drying.

Further, the packaging material 20 for molding as shown in FIG. 4 was obtained by aging the bonded product at 40° C. for 5 days.
[Evaluation of Packaging Material for Molding]

Each packaging material for molding obtained as described above was evaluated based on the following evaluation method. The results are shown in Table 1.
(Concealment)

The packaging material 20 for molding was visually observed from the heat resistant resin layer 2 side, and the one in which the metal foil layer 4 was not visible was evaluated as "Concealable: O" and the one in which the metal foil layer 4 was visible was evaluated as "Non-concealable: X".
(Presence or Absence of Peeling)

For each Example and each Comparative Example, thirty packaging materials 20 for molding were produced, respectively. A packaging material 20 for molding was subjected to deep drawing for forming a protrusion 31 having a length of 33 mm, a width of 54 mm, and a depth of 4.0 mm by contacting the inner thermoplastic resin layer 3 with a punch by using a punch and a die, or the like, thereby producing a test material 30 having a flat flange around the protrusion 31 (see FIG. 5).

Figure 5:
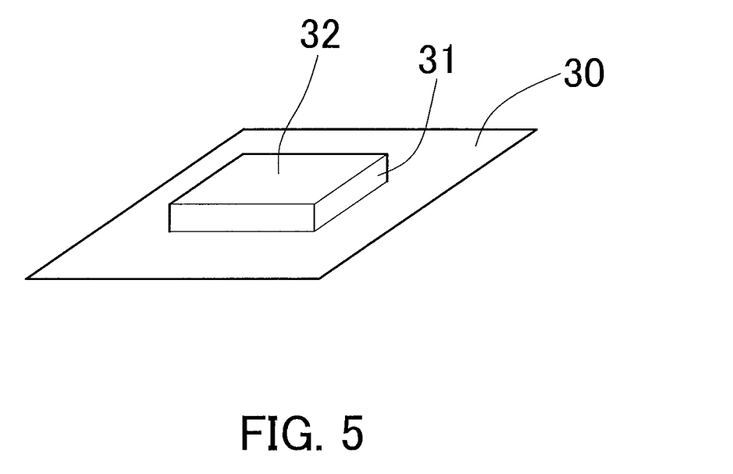
FIG. 5 is a perspective view of a test material.

The top surface 32 of the protrusion 31 of the test material 30 was crushed, and the crushed test material 30 was subjected to a high-temperature and high-humidity test and a hot-water submersion test to examine the presence or absence of peeling of the heat resistant resin layer 2. In the high-temperature and high-humidity test, the crushed test material 30 was held in an atmosphere at a temperature of 70° C., and a humidity of 90% for two weeks. In the hot-water submersion test, the crushed test material 30 was submerged in hot water at 45° C. for two weeks.

In both tests, 30 pieces of the test materials 30 were visually observed after the test, and the determination was made based on the number of test material 30 in which the heat resistant resin layer 2 was peeled off from the metal foil layer 4 according to the following criteria.

◎: pieces
○: 1 to 2 pieces
Δ: 3 to 5 pieces
X: 6 to 30 pieces
(Curl Characteristics)

The packaging materials 20 for molding produced in Examples 1 to 5 and Comparative Examples 1 to 5 were each cut into a blank shape of 100 mm×100 mm to produce a test piece. The raising height of the test piece rises due to curling when it is placed on a level table with its matte coating layer 21 facing upward was then measured and evaluated according to the criteria described below.

○: 0 to 20 mm
X: more than 20 mm
(Molding Height)

The packaging material for molding was subjected to one-stage deep-drawing using a depth-free straight mold under the following molding conditions. For each molding depth (9.0 mm, 8.5 mm, 8.0 mm, 7.5 mm, 7.0 mm, 6.5 mm, 6.0 mm, 5.5 mm, 5.0 mm, 4.5 mm, and 4.0 mm), formability was evaluated. The maximum forming depth (mm) at which good molding can be performed in which pinholes and breaking do not occur at the corner was examined, and the formability was evaluated based on the following criteria. Evaluation of ◎ and ○ denotes a "Passed product". Note that the presence or absence of pinholes was examined by visually observing the presence or absence of transmission light transmitted through the pinholes.
(Molding Condition)

Forming dies: Punch: 33 mm×54 mm, die: 80 mm×120 mm, corner R: 2 mm, punch R: 1.3 mm, die R: 1 mm
Evaluation Criteria For pinholes and the maximum forming depth without causing a crack:
◎: 7.0 mm or more
○: 6.0 mm or more and less than 7.0 mm
Δ: More than 5.0 mm and less than 6.0 mm
X: 5.0 mm or less
(Comprehensive Evaluation)

Based on the five tests of the concealment test, the high-temperature and high-humidity test, the hot water submersion test, the curl characteristic test, and the forming height test, they were comprehensively evaluated according to the following criteria.

◎: There are two or more ◎, , and there is no X.
○: There is one ◎, , and there is no X.
X: There is X or Δ.

TABLE 1

| | | | | | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 |
|---|---|---|---|---|---|---|---|---|---|---|---|---|---|---|
| Config- uration of packaging material for molding | Chemical conversion coating of a metal foil | | | | Both sides | Both sides | Both sides | Both sides | Both sides | Both sides | Both sides | Both sides | Both sides | Both sides |
| | First adhesive agent layer | Ad- hesive agent | Main agent | Number average molecular weight Mn | 12,000 | 12,000 | 12,000 | 12,000 | 12,000 | 12,000 | 12,000 | 12,000 | 12,000 | 12,000 |

TABLE 1-continued

|  |  |  | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 |
|---|---|---|---|---|---|---|---|---|---|---|---|---|
|  | (color adhesive agent composition) |  Weight average molecular weight Mw | 20,500 | 20,500 | 20,500 | 20,500 | 20,500 | 20,500 | 20,500 | 20,500 | 20,500 | 20,500 |
|  |  | Mw/Mn | 1.71 | 1.71 | 1.71 | 1.71 | 1.71 | 1.71 | 1.71 | 1.71 | 1.71 | 1.71 |
|  | Curing agent | Content rate of isocyanate compound aromatic system (mol %) | 100 | 100 | 100 | 100 | 100 | 100 | 100 | 100 | 100 | 100 |
|  |  | (—NCO)/(—OH) mol ratio | 10 | 10 | 10 | 10 | 10 | 10 | 10 | 10 | 10 | 10 |
|  | Carbon black concentration (mass %) |  | 4.4 | 3 | 3.5 | 4.8 | 4.4 | 2 | 3.5 | 6 | 10 | 2 |
|  | Coating amount (g/m$^2$) |  | 6 | 9 | 7.5 | 5.5 | 6 | 13 | 6 | 6 | 6 | 13 |
|  | Carbon black content (g/m$^2$) |  | 0.26 | 0.27 | 0.26 | 0.26 | 0.26 | 0.26 | 0.21 | 0.36 | 0.60 | 0.26 |
|  | Film thickness (μm) |  | 5.5 | 8.3 | 6.9 | 5.0 | 5.5 | 12.1 | 5.5 | 5.4 | 5.1 | 12.1 |
|  | Heat resistant film Hot water shrinkage percentage |  | 4.0 | 4.0 | 4.0 | 4.0 | 1.5 | 1.5 | 1.5 | 1.5 | 1.5 | 4.0 |
|  | Matte coating layer |  | Yes | Yes | Yes | Yes | Yes | Yes | Yes | Yes | Yes | Yes |
| Evaluation | Concealability |  | ○ | ○ | ○ | ○ | ○ | ○ | X | ○ | ○ | ○ |
| Presence or absence of peeling | Hot-temperature and high-humidity test |  | ○ | ○ | ○ | ○ | ○ | ○ | ○ | ○ | ○ | ○ |
|  | Hot water submerge test |  | ◎ | ◎ | ◎ | ◎ | ◎ | ◎ | ◎ | △ | X | X |
|  | Curl characteristic |  | ○ | ○ | ○ | ○ | ○ | X | ○ | ○ | ○ | X |
|  | Forming height (mm) |  | ◎9 | ◎9 | ◎9 | ◎9 | ○6 | ○6 | ○6 | △5.5 | X5.0 | ◎9 |
|  | Overall evaluation |  | ◎ | ○ | ◎ | ◎ | ○ | X | X | X | X | X |

From Tables 1 to 5, it was confirmed that the concealment by the color pigments could be obtained without causing peeling of the heat resistant resin layer even in a harsh environment, it was less likely to curl, and that the formability was also excellent.

Industrial Applicability

The packaging material for molding according to the present invention is suitably used as a case of a battery, such as, e.g., a lithium-ion polymer secondary battery for a notebook computer, a cellular phone, an in-vehicle, or a stationary type, and is also suitable as a packaging material of food and medicine, but is not particularly limited to these applications. Among these, it is particularly suitable for use in a battery case.

This application claims priority to Japanese Patent Application No. 2020-2778 filed on Jan. 10, 2020, and Japanese Patent Application No. 2020-199974 filed on Dec. 2, 2020, the disclosures of which are incorporated herein by reference in their entirety.

It is to be understood that the terminology and phraseology used herein are for the purpose of description and not of limitation, and does not exclude any equivalents of the features shown and described herein, and is intended to admit to various modifications within the scope of the present invention as claimed.

DESCRIPTION OF SYMBOLS 1, 10, 20: Packaging material for molding
2: Heat resistant resin layer (outer layer)
3: Thermoplastic resin layer (inner layer)
4: Metal foil layers (aluminum foil)
5: First adhesive layer (color adhesive agent composition)
6: Second adhesive layer
11a, 11b: Chemical conversion coating
21: Matte coating layer

The invention claimed is:

1. A battery case packaging material for molding, comprising:
a heat resistant resin layer as an outer layer;
a thermoplastic resin layer as an inner layer;
an aluminum foil layer disposed between the heat resistant resin layer and the thermoplastic resin layer;
a first adhesive layer disposed between the aluminum foil layer and the heat resistant resin layer; and
a second adhesive layer disposed between the aluminum foil layer and the thermoplastic resin layer,
wherein the first adhesive layer is composed of a color adhesive agent composition containing a black pigment and an adhesive agent,
wherein the color adhesive agent composition contains the black pigment of 2.5 μmass % or more and less than or equal to 4.9 μmass % with respect to a solid component,
wherein the first adhesive layer is a coating of the color adhesive agent composition of 5 g/m$^2$ to 10 g/m$^2$,
wherein the first adhesive layer contains a content of the black pigment of 0.25 g/m$^2$ to 0.3 g/m$^2$,
wherein a film thickness of the first adhesive layer is 5 μm to 10 μm,
wherein the heat resistant resin layer is composed of a stretched film with a hot water shrinkage percentage of 2% to 5%, and
wherein the black pigment has an average particle diameter of 0.1 μm to 2.5 μm.

2. The battery case packaging material for molding as recited in claim 1, wherein an adhesive agent in the color adhesive agent composition contains a two-part curing type polyester urethane resin composed of a polyester resin as a main agent and a polyfunctional isocyanate compound as a curing agent, wherein the polyester resin has a number average molecular weight (Mn) of 8,000 to 25,000 and a weight average molecular weight (Mw) of 15,000 to 50,000, and a ratio thereof (Mw/Mn) is 1.3 to 2.5, and wherein the polyfunctional isocyanate compound contains aromatic isocyanate of 50 mol % or more.

3. The battery case packaging material for molding as recited in claim 2, wherein in the two-part curing type polyester urethane resin, the polyester resin as a main agent is made from dicarboxylic acid and dialcohol as raw materials, and wherein the dicarboxylic acid contains aliphatic dicarboxylic acid having an even number of methylene of a methylene chain and aromatic dicarboxylic acid, and a content rate of the aromatic dicarboxylic acid to a total amount of the aliphatic dicarboxylic acid and the aromatic dicarboxylic acid is 40 mol % to 80 mol %.

4. The battery case packaging material for molding as recited in claim 2, wherein a cured film of the two-part curing type polyester urethane resin is 70 MPa to 400 MPa in a Young's modulus by a tensile test (JIS K7162).

5. The battery case packaging material for molding as recited in claim 1, wherein a chemical conversion coating is provided on at least one surface of the aluminum foil layer.

6. The battery case packaging material for molding as recited in claim 1, further comprising:

a matte coating layer formed on an outer surface of the heat resistant resin layer.

7. A molded case formed by deep drawing or stretch forming the battery case packaging material for molding as recited in claim 1.

8. The molded case as claimed in claim 7, wherein the molded case is used as a battery case.

\* \* \* \* \*